(12) United States Patent
Wood et al.

(10) Patent No.: US 7,106,309 B2
(45) Date of Patent: Sep. 12, 2006

(54) INTERACTIVE APPARATUS USING PRINT MEDIA

(75) Inventors: Michael C. Wood, Orinda, CA (US); Tracey Hope Jedrzejek, San Francisco, CA (US); Richard Glen Freeman, San Carlos, CA (US); Mark Flowers, Los Gatos, CA (US); Eric Thomas Shuler, Piedmont, CA (US); Margaret E. Grunert, Sunnyvale, CA (US); Jason Avery, Berkeley, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 137 days.

(21) Appl. No.: 10/439,516

(22) Filed: May 16, 2003

(65) Prior Publication Data

US 2003/0218604 A1 Nov. 27, 2003

Related U.S. Application Data

(62) Division of application No. 09/886,401, filed on Jun. 20, 2001, now Pat. No. 6,608,618.

(51) Int. Cl.
*G09G 5/00* (2006.01)

(52) U.S. Cl. .................... 345/173; 345/179; 178/18.01; 178/18.03

(58) Field of Classification Search ............... 345/169, 345/173–179, 204–215; 178/18.01–18.07, 178/19.01–19.06; 434/169–178, 308–318
See application file for complete search history.

(56) References Cited

U.S. PATENT DOCUMENTS

| 4,079,194 A | 3/1978 | Kley |
| 4,425,099 A | 1/1984 | Naden |
| 4,739,299 A | 4/1988 | Eventoff et al. |
| 5,053,585 A | 10/1991 | Yaniger |
| 5,217,378 A | 6/1993 | Donovan |
| 5,401,916 A | 3/1995 | Crooks |
| 5,484,292 A | 1/1996 | McTaggart |
| 5,485,176 A * | 1/1996 | Ohara et al. ................. 345/173 |
| 5,604,517 A * | 2/1997 | Filo ........................... 345/173 |
| 5,636,995 A | 6/1997 | Sharpe, III et al. |
| 5,686,705 A | 11/1997 | Conroy et al. |
| 5,767,457 A | 6/1998 | Gerpheide et al. |
| 5,847,698 A | 12/1998 | Reavey et al. |
| 5,877,458 A | 3/1999 | Flowers |
| 5,992,817 A | 11/1999 | Klitsner et al. |
| 6,144,371 A | 11/2000 | Clary et al. |
| 6,275,301 B1 * | 8/2001 | Bobrow et al. .............. 358/1.2 |
| 6,313,828 B1 | 11/2001 | Chombo |
| 2002/0077902 A1 * | 6/2002 | Marcus ........................ 705/14 |

OTHER PUBLICATIONS

U.S. Appl. No. 09/886,399, Wood et al.

"New Preschool Toys From Fisher–Price Give a Voice To Fun, Creativity And Interactive Play This Holiday Season", Mattel, Inc.: Inventor Relations, http://www.shareholder.com/mattel/news/20000601–43282.cfm, 3 pp.

* cited by examiner

*Primary Examiner*—Vijay Shankar

(57) ABSTRACT

A method for producing an output in response to an interaction with a print element on a sheet is disclosed. In one embodiment, the method includes placing a sheet comprising a print element on a surface of a base unit. A user can then mark on the sheet in the vicinity of the print element with a marking instrument. An audio output that corresponds to the print element is generated.

39 Claims, 12 Drawing Sheets

ACTIVITY MODE – PAGE P

| SHAPE/OBJECT | SOFTWARE CUES | CLICK TYPE | ACTIVITY MODE "AUDIO" LEAP AS NARRATOR |
|---|---|---|---|
| BACKGROUND | UNDERLINING MUSIC PLAYS WHILE WAITING FOR A CORRECT ANSWER | | UNDERLYING MUSIC (BGCTAM1) |
| QUESTION #1 | THERE CAN BE THREE QUESTIONS WHICH CAN BE PROGRAMMED SEQUENTIALLY, SO THAT THE CHILD DOESN'T GET THE SAME SEQUENCE OF QUESTIONS EACH TIME. DEFAULT TO MUSIC AFTER QUESTION IS ASKED. | QUESTION #1 OF 3 W/O ANY COLORING | CAN YOU FIND THE LETTER "P"? |
| QUESTION #1 HINTS | AFTER 1st 5 SECONDS OF INACTIVITY | | 1a) WE'RE LOOKING FOR THE LETTER "P" |
| | AFTER 2nd 5 SECONDS OF INACTIVITY | | 1a) CAN YOU FIND THE LETTER "P"? |
| | AFTER 3rd 5 SECONDS OF INACTIVITY, GO TO SLEEP | | 1c) THANKS FOR LEARNING WITH LeapFrog! BYE-BYE! |
| CORRECT ANSWER: BIG SHAPE P (BIG LETTER) | KILL MUSIC | DT OR DRAG | a1. CORRECT ANSWER SFX |
| | | DT OR DRAG | a2. HOORAY! YOU FOUND THE LETTER "P"! |
| CORRECT ANSWER: LETTER "P" WITH LINE UNDER IT | KILL MUSIC | DT OR DRAG | a1. CORRECT ANSWER SFX |
| | | DT OR DRAG | a2. WAY TO GO! YOU FOUND THE LETTER "P" |
| CORRECT ANSWER: WORD PIE INSIDE BUBBLE | KILL MUSIC | DT OR DRAG | a1. CORRECT ANSWER SFX |
| | | DT OR DRAG | a2. GREAT JOB! YOU FOUND THE LETTER "P" IN THE WORD PIE. |
| | PLEASE APPLY AUDIO TO ALL QUESTIONS: AFTER A CORRECT ANSWER RESPONSE | DT OR DRAG | LET'S PLAY AGAIN! |

FIGURE 10a

ACTIVITY MODE – PAGE P

| INCORRECT ANSWER HINT #1 | AFTER 1st INCORRECT ANSWER | DT OR DRAG | a1. [SHAPE PHRASE]. WE'RE LOOKING FOR THE LETTER "P". |
|---|---|---|---|
| HINT #2 | AFTER 2nd INCORRECT ANSWER | DT OR DRAG | a2. [SHAPE PHRASE]. WE'RE LOOKING FOR THE LETTER "P". THE LETTER "P" IS BIG! |
| HINT #3 | AFTER 3rd INCORRECT ANSWER. QUESTION #2 WILL KICK IN WHEN FINISHED. | DT OR DRAG | a3. [SHAPE PHRASE]. LET'S TRY ANOTHER ONE. |
| SHAPE PHRASE: LEAP | | DT OR DRAG | 1. I'M LEAP! |
| TAD | | DT OR DRAG | 1. I'M TAD! |
| THE PIE | | DT OR DRAG | 1. THAT'S A PIECE OF PIE! |
| EDISON | | DT OR DRAG | 1. I'M EDISON! |
| LETTER "T" | | DT OR DRAG | 1. THAT'S THE LETTER "T"! |
| LETTER "E" | | DT OR DRAG | 1. THAT'S THE LETTER "E"! |
| THE PAN | | DT OR DRAG | NULL |
| QUESTION #2 | QUESTION #2 WILL KICK IN AFTER QUESTION #1 IS FINISHED. DEFAULT TO MUSIC AFTER QUESTION IS ASKED | DT OR DRAG – QUESTION #2 of 3 | CAN YOU FIND THE PIECE OF PIE? |
| QUESTION #2 HINTS | AFTER 1st 5 SECONDS OF INACTIVITY | | 2a) WE'RE LOOKING FOR THE PIECE OF PIE |
| | AFTER 2nd 5 SECONDS OF INACTIVITY | | 2b) CAN YOU FIND THE PIECE OF PIE? |
| | AFTER 3rd 5 SECONDS OF INACTIVITY, GO TO SLEEP | | 2c) THANKS FOR LEARNING WITH LEAPFROG! BYE-BYE! |
| CORRECT ANSWER: THE PIECE OF PIE | KILL MUSIC | DT OR DRAG | a1. CORRECT ANSWER SFX |
| | KILL MUSIC | DT OR DRAG | a2. HOORAY! YOU FOUND THE PIECE OF PIE! |

FIGURE 10b

ACTIVITY MODE – PAGE P

| CORRECT ANSWER: WORD PIE INSIDE BUBBLE | KILL MUSIC | DT OR DRAG | a1. CORRECT ANSWER SFX |
|---|---|---|---|
| | KILL MUSIC | DT OR DRAG | a2. HOORAY! YOU FOUND THE WORD PIE! |
| | PLEASE APPLY AUDIO TO ALL QUESTIONS: AFTER A CORRECT ANSWER RESPONSE | DT OR DRAG | LET'S PLAY AGAIN! |
| INCORRECT ANSWER HINT #1 | AFTER 1st INCORRECT ANSWER | DT OR DRAG | a1. [SHAPE PHRASE]. WE'RE LOOKING FOR THE PIECE OF PIE! |
| HINT #2 | AFTER 2nd INCORRECT ANSWER | DT OR DRAG | a2. [SHAPE PHRASE]. WE'RE LOOKING FOR THE PIECE OF PIE! |
| HINT #3 | AFTER 3rd INCORRECT ANSWER. QUESTION #3 WILL KICK IN WHEN FINISHED. | DT OR DRAG | a3. [SHAPE PHRASE]. LET'S TRY ANOTHER ONE. |
| SHAPE PHRASE: LEAP | | DT OR DRAG | 1. I'M LEAP! |
| TAD | | DT OR DRAG | 1. I'M TAD! |
| EDISON | | DT OR DRAG | 1. I'M EDISON |
| BIG LETTER "P"/LETTER "P" | | DT OR DRAG | 1. THAT'S THE LETTER "P"! |
| LETTER "I" | | DT OR DRAG | 1. THAT'S THE LETTER "I"! |
| LETTER "E" | | DT OR DRAG | 1. THEAT'S THE LETTER "E"! |
| THE PAN | | DT OR DRAG | NULL |
| QUESTION #3 | QUESTION #3 WILL KICK IN AFTER QUESTION #2 IS FINISHED. DEFAULT TO MUSIC AFTER QUESTION IS ASKED | DT OR DRAG – QUESTION #3 of 3 | CAN YOU FIND TAD? |

FIGURE 10c

ACTIVITY MODE – PAGE P

| QUESTION #3 HINTS | AFTER 1st 5 SECONDS OF INACTIVITY | | 3a) WE'RE LOOKING FOR TAD. |
|---|---|---|---|
| | AFTER 2nd 5 SECONDS OF INACTIVITY | | 3b) CAN YOU FIND TAD? |
| | AFTER 3rd 5 SECONDS OF INACTIVITY, GO TO SLEEP | | 3c) THANKS FOR LEARNING WITH LEAPFROG! BYE-BYE! |
| CORRECT ANSWER: TAD | KILL MUSIC | DT OR DRAG | a1. CORRECT ANSWER SFX |
| | | DT OR DRAG | a2. GREAT JOB! YOU FOUND TAD! |
| | PLEASE APPLY AUDIO TO ALL QUESTIONS: AFTER A CORRECT ANSWER RESPONSE | DT OR DRAG | LET'S PLAY AGAIN! |
| INCORRECT ANSWER HINT #1 | AFTER 1st INCORRECT ANSWER | DT OR DRAG | a1. [SHAPE PHRASE] WE'RE LOOKING FOR TAD. |
| HINT #2 | AFTER 2nd INCORRECT ANSWER | DT OR DRAG | a2. [SHAPE PHRASE]. WE'RE LOOKING FOR TAD! |
| HINT #3 | AFTER 3rd INCORRECT ANSWER. QUESTION #3 WILL KICK IN WHEN FINISHED. | DT OR DRAG | a3. [SHAPE PHRASE]. LET'S TRY ANOTHER ONE. |
| SHAPE PHRASE: LEAP | | DT OR DRAG | 1. I'M LEAP! |
| THE PIECE OF PIE | | DT OR DRAG | 1. THAT'S A PIECE OF PIE! |
| WORD INSIDE BUBBLE | | DT OR DRAG | 1. THAT'S THE WORD PIE! |
| EDISON | | DT OR DRAG | 1. I'M EDISON! |
| BIG LETTER "P"/LETTER "P" | | DT OR DRAG | 1. THAT'S THE LETTER "P"! |
| LETTER "I" | | DT OR DRAG | 1. THAT'S THE LETTER "I"! |
| LETTER "E" | | DT OR DRAG | 1. THAT'S THE LETTER "E"! |
| THE PAN | | DT OR DRAG | NULL |

INTERACTIVE APPARATUS USING PRINT MEDIA

CROSS-REFERENCES TO RELATED APPLICATION

This application is a divisional of U.S. patent application Ser. No. 09/886,401, filed on Jun. 20, 2001 now U.S. Pat. No. 6,608,618. This application is herein incorporated by reference for all purposes.

BACKGROUND OF THE INVENTION

Various electronic book systems are known. One electronic book system is capable of recognizing print elements such as figures, letters, and codes that are printed on the sheets of a book. The book is mounted at a fixed location, and the user can arbitrarily designate a specific location to identify a particular print element on the sheet. A sensor system can detect the arbitrarily-designated location. A location detection circuit can, from a determination of an absolute location signal or a predetermined reference point, plus the arbitrarily-designated location point, determine the print element that the user selected. A ROM (read only memory) can be appropriately addressed by the sensor system to provide additional information corresponding print element. The ROM contains the location of the selected print element and related information for that location. The related information can be retrieved for subsequent processing, for example, by a computer-driven system that can provide audio and video images that are related to the selected print element.

While such electronic book systems are useful, many improvements could be made. For example, such electronic book systems do not engage a user in any other activity than selecting a particular figure or letter. To help a user retain knowledge of a particular figure or letter, it would be desirable if the user could interact with the electronic book systems in other ways. Moreover, it would be desirable if the electronic book systems could have other features that could attract a user to use it. By doing so, a user would become more engaged with the book system. The electronic book system could thus be a more effective learning tool than such conventional systems.

Embodiments of the invention address these and other problems.

SUMMARY OF THE INVENTION

One embodiment of the invention is directed to a method of generating audio output, the method comprising: a) placing a sheet having a print element-printed on the sheet on a surface of a base unit; b) marking on the sheet in the vicinity of the print element with a marking instrument; and c) generating an audio output that corresponds to the print element.

Another embodiment of the invention is directed to an interactive apparatus comprising: a) a base unit comprising i) a surface for receiving a sheet having a print element printed on the sheet, ii) an array of electrical elements under the surface, iii) a processor operatively coupled to the array of electrical elements, iv) a memory operatively coupled to the processor, and v) an audio output device operatively coupled to the processor; and b) a marking instrument that is adapted to mark on the sheet in the vicinity of the print element, wherein the audio output device is adapted to provide audio output that relates to the print element when a user makes a mark in the vicinity of the print element with the marking instrument.

Another embodiment of the invention is directed to a system comprising: a) a server computer; b) an interactive apparatus comprising a base unit, wherein the base unit includes i) a surface for receiving a sheet having a print element printed on the sheet, ii) an array of electrical elements under the surface, iii) a processor operatively coupled to the array of electrical elements, iv) a memory operatively coupled to the processor, wherein the memory comprises an output that is related to the print element, and v) an output device operatively coupled to the processor, wherein the output device is adapted to generate the output after a user interacts with the print element while the sheet is on the surface; c) a client computer operatively coupled to the server computer; and d) a printer operatively coupled to the client computer.

Another embodiment of the invention is directed to a method comprising: a) sending code for a sheet having a print element printed on the sheet from a server computer to a client computer at a user site; b) printing the sheet at the user site; c) placing the sheet on a base unit of an interactive apparatus, wherein the base unit includes a surface and an array of electrical elements under the surface; d) interacting with the print element while the sheet is on the base unit; and e) producing an output related to the print element in response to the interaction with the print element.

These and other embodiments are described in further detail below.

BRIEF DESCRIPTION OF THE DRAWINGS

FIG. 10 shows a table of script that can be used in an embodiment of the invention.

DETAILED DESCRIPTION

Figure 1:
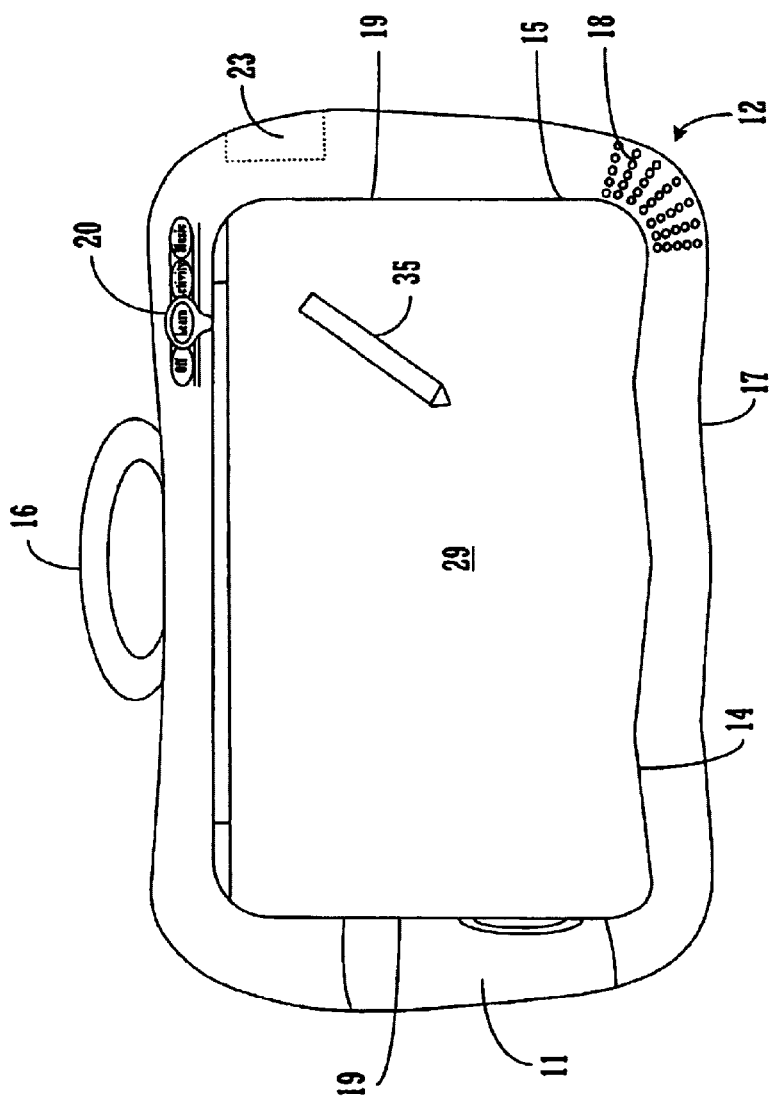
FIG. 1 shows a plan view of an apparatus according to an embodiment of the invention.

In embodiments of the invention, a sheet such as a piece of paper can be placed on a base unit of the interactive apparatus. When the sheet of paper is on the base unit, the user may interact with a print element (e.g., drawings, words, letters) on the sheet. The interaction with the print element can be, for example, marking on the sheet in the vicinity of the print element. The vicinity of the print element can be on the print element or an appropriate distance around the print element.

For instance, the user can color a print element such as a drawing on a sheet on the base unit with a marking instrument such as a crayon. In response to this, the base unit can produce an output that relates to the drawing for the user. Illustratively, if the user is coloring the letter B on a sheet of paper, the output provided to the user may be synthesized speech such as "B, B says buh". In another example, the user can color an animated character that is printed on a sheet on the base unit with crayons or markers. In response to the coloring, the output provided to the user can be the sound of the animated character's voice.

The interactive apparatus according to embodiments of the invention provide appropriate output in response to marking on a sheet. The user can mark the sheet in any suitable manner and with any desired colors. This enhances the user's creativity, self-expression, and imagination as the user can not only select a particular print element on the sheet, but can also mark on it. Accordingly, the user's creativity, self-expression, and imagination skills are used and developed. Also, when the user marks on a print element, the user is actively engaged with the print element. Additional information relating to the print element is provided in response to the marking. The additional information can reinforce or teach educational concepts conveyed by the print element. Because the user is engaged in an activity in addition to listening, the user is more likely to remember the user's interaction with the print elements on a sheet and is more likely to retain any concepts that are taught by the print elements and any additional audio information relating to the print elements. In addition, in embodiments of the invention, a child can be independently attracted to the interactive apparatus by an inviting activity (e.g., coloring, drawing) that the user is familiar with. In one example, children enjoy coloring sheets of paper with crayons and markers. The interactive apparatus can invite a child to color a print element on a sheet with crayons and markers of the child's choice. As the child colors the print element, output related to the print element is provided to the child in response to the coloring. When the child has finished coloring, the child has created a uniquely colored sheet and has learned about the print elements on the sheet in the coloring process.

Any suitable sheet can be used with the interactive apparatus. The sheet can be made of plastic, paper, cardboard, etc., and can be colored or uncolored. In some embodiments, the sheet may be one of many sheets in a book. The book can have any suitable number of pages, and may include a binder such as a spiral or a ring binder. The sheet may also have any suitable size. For example, the sheet can have a standard size such as 5×7, 8.5×11, 8×14, or A4.

Any suitable number or types of print elements can be on the sheet. Exemplary print elements include drawings and portions thereof, words, phrases, portions of words, phonograms, shapes, pictures (e.g., photographs) and portions thereof, symbols, maps, letters, numbers, etc.

In some embodiments, the print elements can be input symbols such as lines and boxes that can be designed to prompt a user for a response. Such input symbols are often found on forms such as test and questionnaire forms. Output (e.g., audio output) that is related to the correctness or incorrectness of the response, or audio output that helps the user provide a response (e.g., audio help information) can be provided to the user. For example, the print elements may be printed boxes that can be marked by the user to indicate a particular selection. For instance, a multiple choice form can have boxes that are associated with the letters a), b), and c) and three different answers. The user can select one of the answers by marking on one of the boxes with a check mark or an "x" mark. An audio response can be provided to the user in response to the marking. For example, the output "sorry, b) is incorrect" can be provided to the user after the user checks the box associated with the letter b), where the correct answer to the question posed by the interactive apparatus is the one associated with the letter a). Alternatively or additionally, the interactive apparatus may record the user's responses. In these embodiments, the user's responses may be recorded in the memory of the base unit of the interactive apparatus and on the sheet. A record of the user's responses can be recorded on the sheet and also electronically in the base unit of the interactive apparatus.

The base unit of the interactive apparatus may have any suitable characteristics. In some embodiments, the base unit can comprise a major surface. The major surface may be uneven, but is preferably flat so that a user can write on it. The major surface can be smooth and washable so that markings such as crayon marks can be easily removed from it.

An array of electrical elements is underneath the major surface of the base unit. In some embodiments, each electrical element is a pressure-sensitive switch that is activated by pressure. A suitable pressure-sensitive switch may comprise, for example, facing conductive regions that are separated by an air gap. Pressure applied to the conductive regions causes the facing conductive regions to contact each other closing the switch. Another type of electrical element may be a piezoelectric type element. The application of pressure to a piezoelectric type element causes it to change resistance. In either case, pressure can be applied by, for example, a marking instrument such as a crayon that is above the electrical element.

In other embodiments, the electrical elements can be antennas such as those described in U.S. Pat. No. 5,877,458 or 5,686,705, and U.S. patent application Ser. No. 09/574,599 and No. 60/200,725. All of these patents and patent applications are assigned to the same assignee as the present application and are incorporated herein by reference in their entirety for all purposes. The antennas can transmit signals that can be received by a stylus that is coupled to the base unit. The stylus acts as a receiving antenna. When the stylus is positioned over the major surface, the stylus receives a signal that is particular for the electrical element underneath the stylus. Then, the position of the stylus relative to the major surface can be determined. The stylus could be used to interact with print elements on a sheet that is secured to the base unit. The electrical elements may be transmitting antennas that regularly transmit signals that are received by the stylus, or may be receiving antennas that receive a signal from the stylus. In these embodiments, a user need not selectively activate the electrical elements. As explained below, the stylus can also be a marking instrument.

In embodiments of the invention, some or all of the electrical elements in the array of electrical elements can be pre-assigned to retrieve and provide specific outputs for the user. Preferably, the electrical elements retrieve the pre-assigned outputs after they are activated. In addition, some of the electrical elements can be pre-assigned to indicate that a different sheet with different print elements is on the base unit when they are activated. For example, once an electrical element associated with a new sheet is activated, a processor can reprogram the interactive apparatus so that the electrical elements in the array are re-assigned to retrieve outputs associated with the print elements in the new sheet.

The output provided to the user by the interactive apparatus may be visual output and/or audio output. Audio output is preferred as audio output can supplement and reinforce visual information such as letters, pictures, and numbers that may be on the sheets. The combination of both audio output and visual output reinforces concepts that are taught by the interactive apparatus. Exemplary output can include letters, stories, numbers, words, phrases, jokes, music, questions, answers, prompts, sound effects, facts, etc. Preferably, the audio output is provided in response to the user's act of marking on the sheet.

In some embodiments, the output can be a prompt that asks the user for a response. For example, an exemplary question that the interactive apparatus might ask the user may be "Can you find the letter P?" In response, the user can mark on the letter P on the sheet. After the user responds, output relating to the correctness or the incorrectness of the user's response can be provided to the user. For example, if the user's response is correct, a reward output (e.g., "that's right!") can be provided to the user. If the response is incorrect, the question can be repeated or the user can be informed that the response was incorrect.

In other embodiments, the output provided by the interactive apparatus can include clues that help the user answer a question that was previously presented by the interactive apparatus. For example, a user may place a coloring sheet with the numbers 1 through 10 on a base unit. An initial prompt by the base unit may be, for example, "Can you color the number 10?" If the user does not color the number "10" after a predetermined period of time, the interactive apparatus can prompt the user to obtain a clue by selecting another print element or pressing a button (e.g., in a removable template on the base unit or in the base unit). After the user selects the button or the print element, the apparatus can provide a clue such as "The number 10 comes after the number 9" to the user. Providing clues to the user can help the user learn about a given subject.

As noted, in embodiments of the invention, the output provided to the user can relate to a particular print element with which the user is interacting. So, for example, the same output is not produced when the user colors the letter D and when the user colors the letter F. Rather, different outputs that specifically relate to the different print elements are presented to the user. For instance, sounds such as "dee" and "efff" are provided to the user after the user colors on the letters D and F, respectively.

The output can have some relationship to the information conveyed by the print element or the nature of the print element. For instance, the output can relate to the identity, form, color, shape, or quality of a print element on a sheet. For example, after coloring on a drawing of a frog on a sheet of paper on the base unit with a crayon, the phrase "Hi, I'm Leap!" can be retrieved from memory and a speaker in the base unit can sound the phrase to the user. Alternatively or additionally, the output can provide additional information about a particular print element. For example, a print element can be in the form of a state such as California. After the user interacts with the print element, information such as the population, the history, and/or the area of the state can be presented to the user.

In some embodiments, a removable template can be used to secure the sheet to the base unit. Preferably, the removable template can have bright colors and/or two or three-dimensional characters (e.g., animated figures). Features such as these can invite a child to interact with the interactive apparatus. The removable template may also be made of plastic and can be rigid or flexible. A rigid removable template is preferred as children can easily manipulate it. It is easier to align than a flexible template. In some embodiments, the removable template can be a substantially planar layer of molded plastic. Moreover, the removable template can have any suitable planar dimensions or thickness. For example, a typical removable template can have a thickness that is less than about 0.5 inches and planar dimensions greater than about 8.5×11 square inches. In other embodiments, a non-removable template can be used with the base unit. The non removable template can have the same or different features as the described removable template.

The removable template can have a stationary portion and movable elements that move substantially independently of the stationary portion. The movable elements can be moved by a user and can interact with an electrical element underneath the movable element. For example, the user can apply pressure to the major surface of the base unit using a movable element. The applied pressure causes a pressure-sensitive switch underneath the movable element to activate. As a result of the activation, appropriate audio output can be presented to the user.

Each movable element in the removable template may have a structure and an appearance that is distinct from the stationary portion. For example, in some embodiments, the movable elements may be buttons that are disposed in apertures in the stationary portion. The buttons are coupled to the walls of the apertures with flexible connectors that allow the buttons to move substantially independently of the stationary portion. In some embodiments, the movable elements can also be disposed in elongated apertures (i.e., with respect to the plane of the removable template) in the removable template. A movable element can move within an elongated aperture and also in a direction parallel to the orientation of the removable template.

If a removable template is used to secure a sheet to the base unit, the removable template is preferably easily removable from the base unit. The user need not use any special tools or procedures to remove and separate the removable template from the base unit. Preferably, a removable template can rest on the major surface of the base unit without the use of clips or adhesives. In this regard, different removable templates having different types, patterns, or sizes of movable elements can be interchangeably placed on the major surface of the base unit without difficulty. The interface presented to the user can be readily changed. As the removable templates are changed, the look, feel, and functionality of the interactive apparatus changes. In comparison to many conventional electronic toys, a child need not be presented with the same set of buttons and the same corresponding set of sounds each time the child uses the interactive apparatus. Consequently, children are less likely to become disinterested using embodiments of the invention than conventional electronic toys. Additional details regarding suitable removable templates that can be used in embodiments of the invention can be found in U.S. patent application Ser. No. 09/886,399, entitled "Interactive Apparatus with Templates". This patent application is assigned to the same assignee as the present application and is herein incorporated by reference in its entirety for all purposes.

The interactive apparatus can be used for any purpose. For example, it can be used to entertain and/or educate the user. In some embodiments, the sheets can be designed so that the user can play games. For example, a sheet that is secured to the base unit may have a maze printed on it. The user can use a pencil or other marking instrument to trace a path through the maze. Pressure is applied to the major surface under the sheet using the pencil. Electrical elements underneath the pencil are activated and a processor in the base unit can electronically track the path of the pencil. Audio output (e.g., "wrong way!") can be provided to the user if the user strays from the correct path in the maze. In another example, the interactive apparatus can teach the user about specific print elements. For example, specific letters or numbers can be printed on a sheet. The output that is provided to the user may relate to the name or sound of the letters or numbers. Alternatively or additionally, the output can be an illustration of how a number or letter is used. In yet another example, embodiments of the invention can be used to teach the user kinesthetic skills. For example, the interactive apparatus can help a user learn how to write letters or numbers. For example, electrical elements underneath the major surface of the base unit can electronically track the path of the user's marking instrument. The interactive apparatus can determine if the user has successfully written a particular letter or number on a sheet. Appropriate feedback can be provided to the user depending upon whether the user has correctly written the particular letter or number on the sheet. After writing, the user can take the sheet and keep it or show it to another person (e.g., a teacher or parent). Accordingly, embodiments of the invention have more functionality than simply providing declaratory instruction to a user. The user may, for example, practice handwriting skills using embodiments of the invention.

In yet other embodiments, the sheets can be designed to specifically educate the user about a predetermined subject. For example, the interactive apparatus and the removable templates can be designed to teach a user about colors, letters, shapes, numbers, word pronunciation, phonics, current events, songs, general math, algebra, subtraction, multiplication, division, fractions, decimals, geometry, science, geography, history, spelling, grammar, the names and sounds of musical instruments, people, places, nature, music, sports, letters, numbers, counting, social studies, creative expression, languages such as English and Chinese, etc. The skills taught by the interactive apparatus can include recognition skills (e.g., number and letter recognition) and logic skills. Accordingly, in some embodiments, the interactive apparatus can be characterized as an educational toy.

Although in some embodiments, the interactive apparatus has been described as an educational toy, in other embodiments, the interactive apparatus need not be a children's toy and could be used by adults. For example, in some embodiments, the different sheets that are used with the base unit can be designed to teach adults a second language. In another example, the sheet on the base unit may be a pre-printed form that is to be filled in by the user. The interactive apparatus can provide output that assists the user in filling out the form, provide appropriate feedback to the user's selections, and/or automatically and electronically record the user's selections on the form.

The user of the interactive apparatus can be of any suitable age (e.g., an adult or child). For example, the user can be a child that is less than about 10 years old (e.g., a pre-school age child between about 3 to about 5 years old). In embodiments of the invention, the interactive apparatus engages children with talking characters, music, sounds, and fun learning activities. Important skills (e.g., preschool skills) can be taught to children while encouraging creativity, self-expression and imagination.

An interactive apparatus embodiment can be described with reference to FIG. 1. FIG. 1 shows a base unit 12 and a marking instrument 35 of an interactive apparatus according to an embodiment of the invention. The base unit 12 includes an edge region 17 that surrounds a major surface 29 of the base unit 12. The edge region 17 and other parts of the base unit 17 can be made of molded plastic. The underside of the base unit 12 may have a storage recess for storing one or more removable templates (not shown) and/or sheets when they are not in use.

A handle 16 is attached to the edge region 17. The handle 16 may be retractable or detachable from the main body of the base unit. Using the handle 16, the user can easily transport the base unit and any removable templates or sheets that are used with the base unit (not shown). Accordingly, the interactive apparatus can be portable and can be carried by a young child. In this regard, the interactive apparatus can have planar dimensions that are less than about 3 ft. by about 3 ft. For example, the base unit 12 may have dimensions of approximately 13"×18.75"×3" (W×L×H).

The edge region 17 of the base unit 12 can have any suitable features. For example, a covered or uncovered storage space 11 can be in the edge region 17. The storage space can store the user's personal items and marking instruments such as pencils or crayons. In addition, a speaker 18 is in the edge region 17 of the base unit. Pre-recorded or synthesized sounds can be provided to the user through the speaker 18. The sounds can be music, synthesized words, phrases, and word segments, sound effects, etc. A slot 23, (shown by invisible lines) for a transferable information storage medium (not shown) can also be included in the edge region 17. The slot 23 can be cooperatively structured to receive the transferable information storage medium. A spring-loaded door (not shown) can cover the slot 23 and can be pushed inward when, for example, a data cartridge is inserted into the slot 23.

A selecting device 20 is also in the edge region 17 to let the user select a particular mode of operation. As shown in FIG. 1, the selecting device 20 can be in the form a slideable knob. The user can use the selecting device 20 to turn the interactive apparatus on or off. When it is on, the user can further select from a learning mode, a game mode, and a music mode. In the learning mode, the primary output provided by the interactive apparatus can be output that teaches the user about a predetermined subject. For example, when the interactive apparatus is in the learning mode, the user can interact with a print element of a particular color or shape. In response, the interactive apparatus can state the shape and the color of the print element to the user. In the game mode, the user can play games or the interactive apparatus can quiz the user. For example, a sheet having the letters A through Z can be on the base unit. The interactive apparatus may prompt the user by saying "Can you color the letter D?" If the user colors the wrong letter, the interactive apparatus can tell the user the name and sound of the letter (e.g., "B, B says buh."). If the user selects the right letter, the interactive apparatus can reward the user. For example, a congratulatory phrase such as "you did it!" or other rewarding sound effect could be provided to the user if the user correctly colors the letter D. Thus, the interactive apparatus can provide different types of output to the user depending upon whether the user marks on the right or wrong print element. In the music mode, different musical segments can be produced when the user marks on different print elements. For example, if a sheet with print elements is on the base unit, different musical segments can be presented to the user when the different print elements are colored. This entertains the user and keeps the user engaged with the interactive apparatus.

The major surface 29 of the base unit 12 can have any suitable characteristics or size. The major surface 29 can be the upper surface of a layer of polyvinyl acetate or other suitable polymeric material. Preferably, the major surface 29 is made of a material that can be easily washed if, for example, crayon markings are made on the major surface. In some embodiments, the major surface 29 can have planar dimensions that are larger than a standard sheet of paper. For example, the major surface 29 can have planar dimensions that are more or less than about 8.5×14 inches. Such larger dimensions can accommodate a removable template that can secure a standard sheet of paper to the base unit 12.

The edge region 17 in this and other embodiments can be cooperatively structured to receive a removable template or a sheet (not shown). In the illustrated example, the edge region 17 is raised with respect to the major surface of the base unit 12 and encircles the major surface. When, for example, a removable template or a sheet is placed over the major surface of the base unit 12, the edge region 17 guides the removable template or sheet so that it is correctly positioned over the major surface of the base unit 12. The print elements in the sheet are also correctly positioned over the electrical elements under the major surface of the base unit 12. Accordingly, in embodiments of the invention, the removable template or the sheet can be self-aligning with respect to the major surface of the base unit 12. This makes it easy for a user such as a child to place the removable template or the sheet on the surface of the base unit 12 and use the interactive apparatus. A user need not worry about aligning the removable template or the sheet so that the print elements perfectly correspond to the electrical elements underneath the major surface.

A marking instrument 35 may also be used with the base unit 12. The marking instrument 35 may be separated from the base unit 12 or coupled to the base unit 12. For example, the marking instrument 35 may be coupled to the base unit 12 with a retractable or a non-retractable wire. Examples of suitable marking instruments include crayons, markers, pencils, pens, etc.

Figure 2:
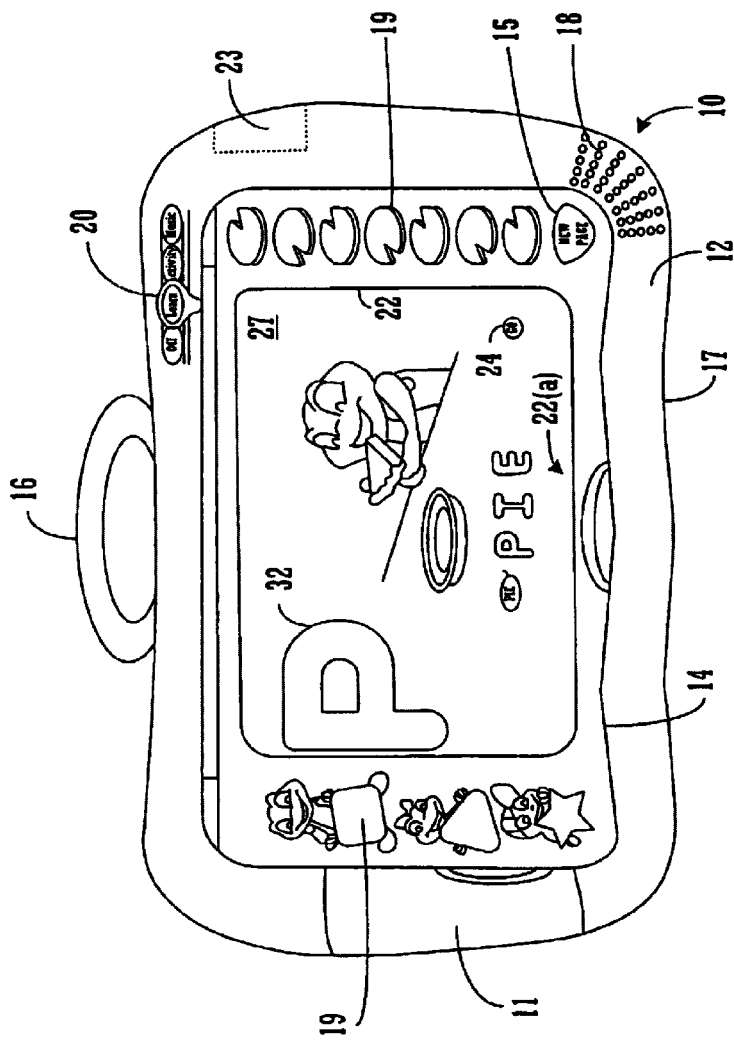
FIG. 2 shows a plan view of a base unit of an interactive apparatus with a removable template that secures a sheet to the base unit.

FIG. 2 shows an interactive apparatus comprising a removable template that secures a sheet to the base unit 12. The removable template 14 includes a hinge that joins a first portion 22 and a second portion (not shown) that is underneath the second portion. Both the first and the second portions may be in the form of frames. They can also be substantially planar. The second portion is underneath the first portion 22. The second portion may have a window (or a flexible membrane) of about the same size as the window in the first portion so that pressure can be applied through it and to the major surface under the removable template 14. Together, the first portion and the second portion form a clamshell.

The first portion 22 has a frame that defines a window. A user can lift the first portion 22 by grasping a raised portion 22(*a*) formed in the first portion 22. Lifting the first portion causes an actuator (not shown) at the bottom of the removable template 14 to apply pressure to an electrical element (e.g., a switch) underneath the removable template 14. A voice from the speaker 18 can then say, "Put in a new coloring page". At this point, some of the electrical elements can be locked out (i.e., non-responsive) until a sheet is loaded and the user presses an indicator (e.g., a green "Go" circle) that informs the base unit as to the particular sheet that is on it. The user can then place a sheet 27 between the first and the second portions. The user then closes the removable template by bringing the first portion 22 next to the second portion. The sheet 27 can then be viewed through the window in the first portion 22. A voice from the speaker 18 may then say, "Let's color while we learn our ABCs".

The user may depress the "Go" circle 24 (or other identifier) printed on the sheet 27 to inform the base unit that the sheet 27 is on it. A voice from the speaker may prompt the user with the phrase "touch the Go circle on your coloring page!" The user can then depress the "Go" circle with a crayon or finger. Depressing the "Go" circle causes an electrical element under the major surface to activate. Activating the electrical element under the "Go" circle informs the base unit that the particular sheet 27 shown in FIG. 2 is on the base unit 12. If the user presses the wrong section of the sheet 27 and activates an electrical element designated for another sheet, the user can depress the reset button 15. After depressing this button, the interactive apparatus can reset itself and can prompt the user to "Press the green Go circle" to continue.

The sheet 27 includes a number of print elements. The print elements on the sheet 27 include a large letter P, the word PIE, and a drawing of a frog eating a piece of pie. The user can color any of these print elements with crayons or markers. As the user colors a print element, pressure is applied to the sheet 27 and to the major surface that is underneath the sheet 27. The applied pressure activates one or more electrical elements (not shown) underneath the print element being colored. After the one or more electrical elements are activated, audio corresponding to the print element being colored by the user can be provided to the user through the speaker 18. For example, as the user is coloring the word "PIE", a synthesized voice coming from the speaker can say, "pie, pie is spelled P-I-E". In another example, if the user colors the picture of the frog eating the piece of pie, the audio provided to the user may be the sound of the character shown in the drawing eating a piece of pie.

An exemplary script table that can be associated with the sheet 27 is shown in FIG. 10. As shown in FIG. 10, different audio outputs can be provided in response to the user's selection of different print elements. In FIG. 10, "dt" means "down touch" onto a print element and "drag" means that the user is dragging an instrument across a print element. "sfx" stands for "sound effects".

After the user is finished interacting with the sheet 27, the sheet 27 can be replaced with a sheet with different print elements. For example, the sheet 27 may be replaced with a sheet that shows a large letter "A" and a picture of an ant. The user may inform the base unit, or the base unit may be automatically informed, that a different sheet is on the base unit. A processor in the base unit can then assign the electrical elements so that outputs that are specific to the print elements on the new sheet are produced. For example, the user can color the picture of an ant and a synthesized voice coming from the speaker can say, "Ant is spelled A-N-T".

Figure 3:
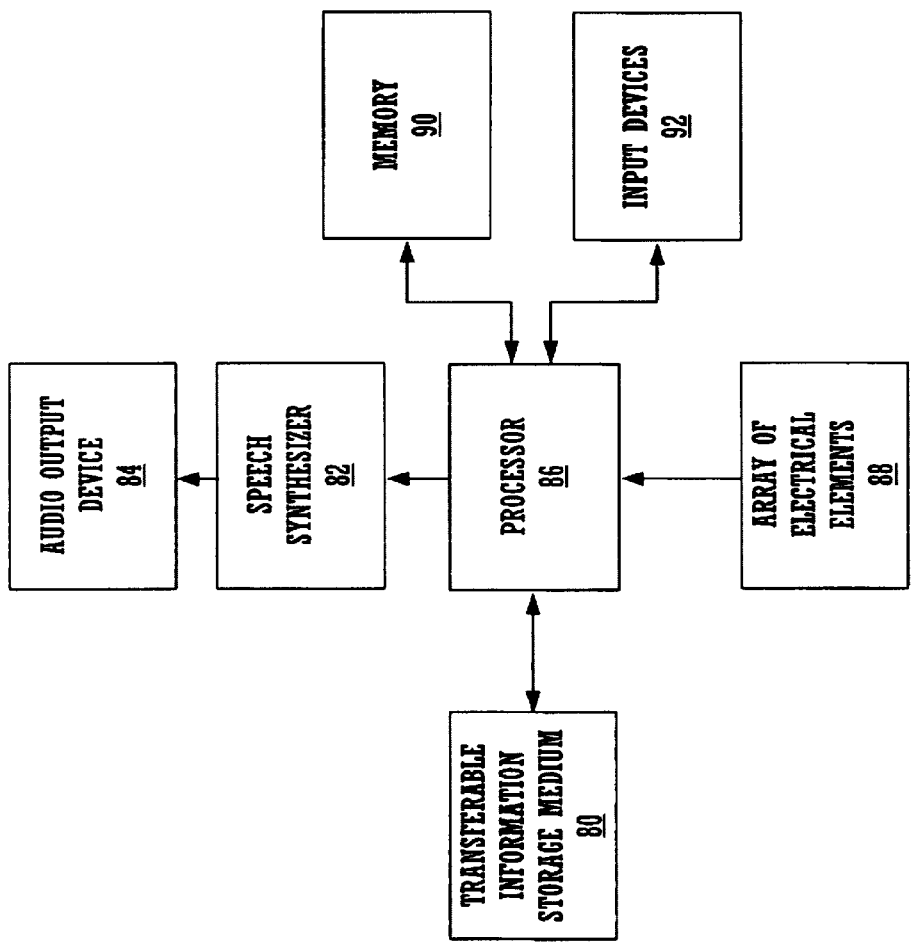
FIG. 3 shows a block diagram of an apparatus according to an embodiment of the invention.

FIG. 3 shows a block diagram of some of the components in an interactive apparatus according to an embodiment of the invention. Each of the components shown in FIG. 3 can be housed in a base unit. Some of the components (e.g., the transferable information storage medium 80) can be physically separated from the base unit.

The interactive apparatus includes a processor 86. The processor 86 may be one or more microprocessors that facilitate the operation of the interactive apparatus. In embodiments of the invention, the one or more microprocessors may include an ASIC (application specific integrated circuit).

The processor 86 may be coupled to any suitable electronic component. In FIG. 3, the processor 86 is coupled to a memory 90, an input device 92, and an array of electrical elements 88. A speech synthesizer 82 and an audio output device 84 provide synthesized speech or other audio output for the user. A transferable information storage medium 80 is removably coupled to the processor 86. In some embodiments, the transferable information storage medium 80 is insertable into a slot in the base unit. Data can be retrieved from the base unit or provided to the base unit through the transferable information storage medium.

The speech synthesizer 82 can be a speech synthesizer chip that is separate from a microprocessor that facilitates the interaction between the various components in the interactive apparatus. Alternatively, the speech synthesizer 82 can be incorporated onto a computer chip along with logic circuitry that facilitates the interaction between the various components in the interactive apparatus.

The audio output device 84 provides audio output for the user. Examples of audio output devices include speakers and earphone jacks. Other output devices such as visual output devices (not shown) can be used in addition, or as an alternative, to the audio output device 84. Examples of visual output devices include VGA (video graphic array) displays, LCDs (liquid crystal displays) and LEDs (light emitting diodes).

The memory 90 may be any suitable temporary or permanent information storage device. The memory 90 may include optical, magnetic, or electronic storage media such as optical or magnetic disks, tapes, sticks, and the like. Any suitable combination of information storage devices can collectively make up the memory 90 of the interactive apparatus. In some embodiments, the memory 90 can include one or more RAM (random access memory), ROM (read only memory) and EPROM (erasable programmable memory) chips. For example, the memory 90 can include a ROM chip that has a storage capacity of about 2 megabytes or more.

The memory 90 can store any suitable information. For example, the memory 90 can store electronic maps for the removable templates and code for the sheets that are used with the base unit. Each electronic map can associate a particular electrical element in the array of electrical elements with a particular output. The particular output can relate to a particular print element on a printed sheet. The memory 90 may store code for the user's name or code to retrieve the user's name from, e.g., a transferable information storage medium. The apparatus can greet the user with a first name so that the user's experience is personalized. Code for the outputs can also be stored in the memory 90.

In some embodiments, information such as questions, words, pictures, musical sounds, applications, etc. may be stored in libraries of code, libraries of resources, and libraries of applications. These libraries can be present in the memory 90. Information such as this may be stored once in the memory 90 and may be accessed according to a set of instructions provided to the processor 86. Sets of instructions for manipulating data, rather than the data files themselves, can be quickly transferred to and from the interactive apparatus. Large data files such as sound and image files need not be stored in and repeatedly transferred to and from the base unit. Small instruction files may be transferred, thus resulting in faster data transfer and lower memory capacity requirements. Music data, for example, may be quickly transferred to and from the interactive apparatus according to a MIDI (Musical Instrument Digital Interface) or MIDI-like protocol. For example, in some embodiments, actual audio data need not be transferred to and from the base unit, just the instructions to play the audio data. This allows the same audio sequences stored in the base unit to be used multiple times with no additional audio storage required.

Instructions to play audio data may include general audio sequences (GASs) GASs are very compact instructions for specifying and playing audio resources. A single GAS command sequence can specify a complicated sequence of audio. Exemplary GAS commands may include the following:

GAS commands for hGAS_HelloThere
Play hCA_Hello
Wait 0.1 seconds
Play hCA_There

In this example, actual audio data for the words "Hello" and "There" need not be transferred to and from the base unit. These phrases can be stored once in the memory of the base unit and can then be retrieved and played according to instructions that are transferred to and from the base unit. Instruction files are generally smaller in size than actual audio files so that they can be transferred to and from the base unit more quickly than actual audio files. Thus, the interactive apparatus according to embodiments of the invention can be readily updated.

The general audio sequences (GAS) can call various audio resources that may be stored as CA, SYN and RAW audio resources. Although any suitable labels may be used, SYN may be a short form for the word "synthesized" and may be used in conjunction with an on-chip synthesizer used for musical instruments, horn honk, animal sounds, etc. "SYN" files may be derived from musical instrumental digital interface (MIDI) type files. "RAW" may be raw, or uncompressed, audio sound files. They can be used when sounds of very high quality are desired. "CA" may stand for "compressed audio" files.

Each CA audio resource is a compressed binary file representing a word, phrase, or sound. Each SYN audio resource may be a set of commands representing instruments and notes. In some embodiments, the actual instrument sound files are not stored with the SYN audio resource, just the commands. This allows musical sets of commands to specify complex musical pieces with very high quality in very small space. The instrument sounds and notes are stored in a RAW audio resource file which may be an uncompressed binary file representing a sound. It may be used when high quality audio output is desired.

One or more input devices 92 can be included in the interactive apparatus. Examples of input devices include styluses, knobs, buttons, and levers. These may be in the edge region of the base unit. For example, the previously described selecting device can be an input device. Other input devices such as volume controls can also be in the base unit.

Any suitable transferable information storage medium 80 may be used in the interactive apparatus. For instance, the transferable information storage medium 80 may be a cartridge, a disk, a tape, or a memory stick. Data cartridges are especially desirable since they can be easily manipulated and handled by children. In some embodiments, the transferable information storage medium 80 comprises a flash memory cartridge.

The transferable information storage medium 80 can be used to provide new computer code to the interactive apparatus. Suitable computer code can include code that updates the interactive apparatus so that a new sheet can be used with the interactive apparatus. In addition, the code can also update the interactive apparatus so that other sheets can be used with the interactive apparatus. Thus, by using the transferable information storage medium 80, the interactive apparatus can be reprogrammed so that new sheets with different print elements printed on them can be used with the interactive apparatus. It can also be used to transfer audio or graphics data as well as instructions to play audio or graphics data to the interactive apparatus.

The transferable information storage medium 80 can also be used to retrieve computer code from the interactive apparatus so that it can be used elsewhere. For example, the user's performance information can be recorded in a user log file stored in the transferable information storage medium 80. The user's performance information can be logged to the user log file and the performance information can be uploaded to a server computer. Using the performance information and optionally a personal profile, the server computer can select content for the user. This performance information can be recorded in the user log in the transferable information storage medium 80 and can be uploaded to a server computer. The interactive apparatus can thus adapt to the user's learning ability over time so that new and different challenges are presented to the user. Adaptive learning processes and systems are described in greater detail in U.S. patent application Ser. No. 09/632,424 filed Aug. 4, 2000, which is assigned to the same assignee as the present invention and which is herein incorporated by reference in its entirety for all purposes.

In some embodiments, a transferable information storage medium is not needed to transfer computer code to and from the base unit. For example, the base unit can have or be coupled to a transceiver (e.g., an RF transceiver) that can receive or send computer code to a computer that is separated from the base unit. In another example, the base unit can have a data port such as a USB (universal serial bus) port that allows a user to transfer data to and from the base unit through a physical connection. The physical connection may be a data cable coupled to a computer.

The base unit of the interactive apparatus can be powered using batteries or a power cord. Preferably, the electronics in the base unit 12 are powered using batteries. In addition, the base unit 12 may automatically shut off when the interactive apparatus has not been used for a predetermined period of time (e.g., 1 or 3 minutes or more). By doing so, battery power can be conserved if the user forgets to turn off the interactive apparatus. Children are particularly likely to forget to turn off electronic toys after they are finished using them.

Figure 4:
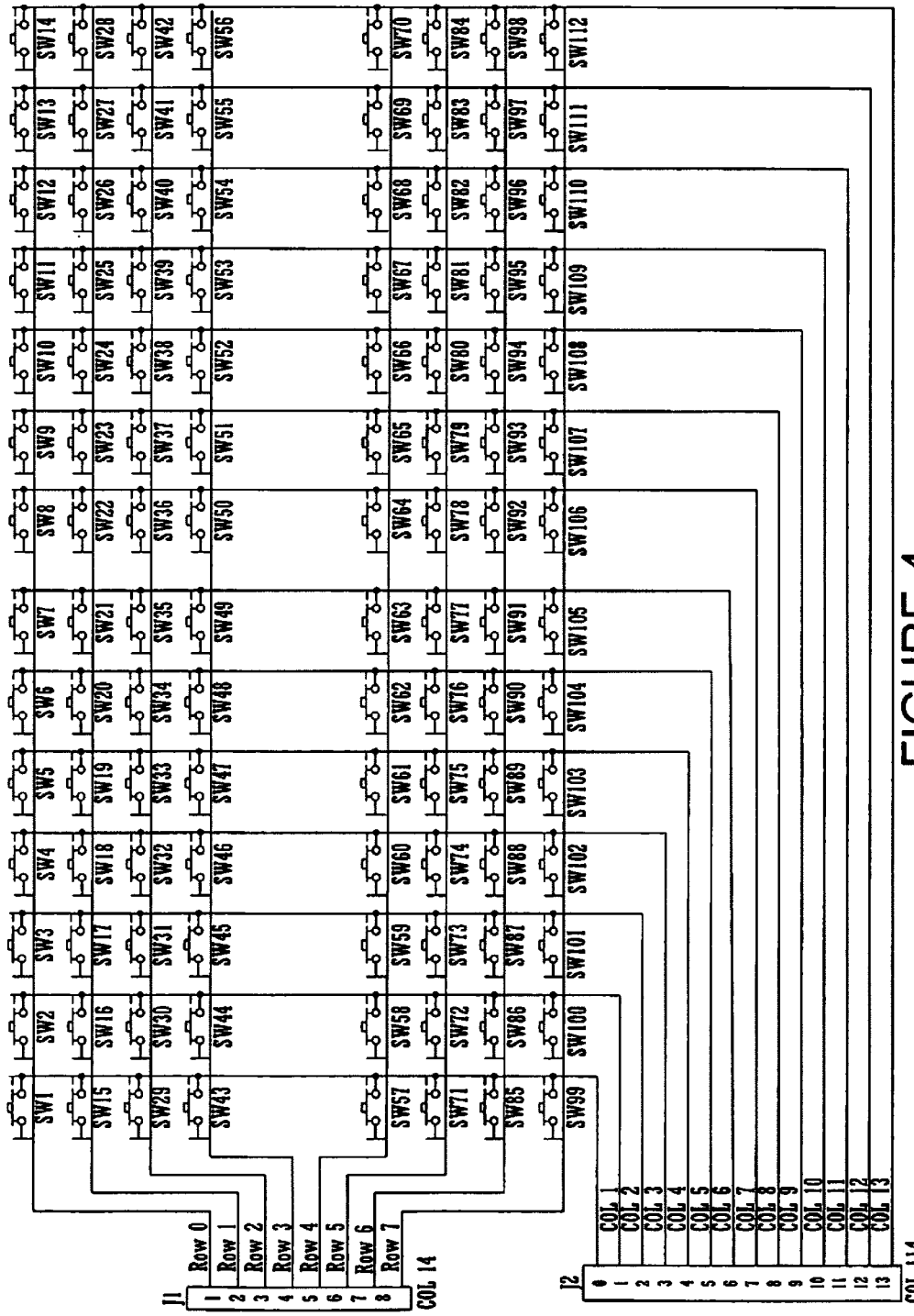
FIG. 4 shows an electrical schematic diagram of an array of electrical switches.

As noted, the array of electrical elements 88 can be located underneath the major surface of the base unit. The electrical elements in the array can be arranged in a regular or an irregular manner. For example, the electrical elements may be arranged in a plurality of rows and columns in the array. Each electrical element can correspond to a particular row and a particular column in the array of electrical elements 88. An exemplary schematic electrical diagram of an array of electrical switches is shown in FIG. 4. In the diagram, there are 8 rows and 14 columns for a total of 112 switches that are labeled 1 through 112. Each switch can correspond to a particular row and a particular column.

In an array of electrical elements, a portion of the electrical elements in the array may correspond to the print elements in one sheet, while other electrical elements in the array may correspond to print elements in a different sheet. For example, referring to FIG. 4, print elements in a first sheet may be designed to activate switches 47, 60, and 69 and provide outputs that are related to print elements on a first sheet. A second sheet can be designed to activate switches 71, 74, and 80 and provide outputs that are related to print elements on the second sheet. By designating certain switches within an array to be used with certain sheets, the electrical elements in the array of electrical elements need not be reassigned to retrieve different output for each sheet that is used with the base unit.

In some embodiments, one or more electrical elements in the array of electrical elements 88 can be assigned to identify the particular sheet with one or more distinct print elements being used by the user. A print element can be provided in each of the sheets to activate a certain electrical element. The electrical element can be pre-assigned to inform the base unit that a different sheet is on the base unit. After being activated, certain electrical elements in the array of electrical elements 88 can be re-assigned to retrieve outputs that correspond to the new sheet that is on the base unit.

Illustratively, again referring to FIG. 4, a first sheet (not shown) is placed over the array of switches. A "Go" button (or other indicator) in the upper right hand corner of the first sheet can be depressed to activate the switch 14. A synthesized voice from a speaker in the base unit can prompt the user to press the "Go" button. By activating the switch 14, the processor determines that the first sheet is on the base unit. Switches 85, 87, and 89 can be assigned to retrieve outputs that are specific to the print elements on the first sheet. After interacting with the print elements on the first sheet, a second sheet can be placed over the array of switches. The second sheet can have a "Go" button at the lower right hand corner. The "Go" button in the second sheet can be disposed over switch 112. Other print elements in the second sheet can be disposed over switches 85, 87, and 89. After depressing the "Go" button on the second sheet, the switch 112 is activated and the processor determines that second sheet is on the base unit. The processor subsequently re-assigns switches 85, 87, and 89 so that when they are activated, outputs that relate to the print elements on the second sheet are retrieved instead of outputs that relate to the print elements on the first sheet.

As noted, the electrical elements can be pressure-sensitive switches. In some embodiments, each switch may have an upper conductive region and a lower conductive region that are not in contact with each other in the absence of applied pressure. The upper conductive region may be in a specific row while the lower conductive region may in a specific column (or vice versa). When pressure is applied to the upper conductive region, the upper conductive region contacts the lower conductive region closing a circuit and activating the switch. The processor determines the row and the column of the depressed switch. It can then retrieve output that was assigned to the activated switch from memory. This output can then be presented to the user.

Figure 5:
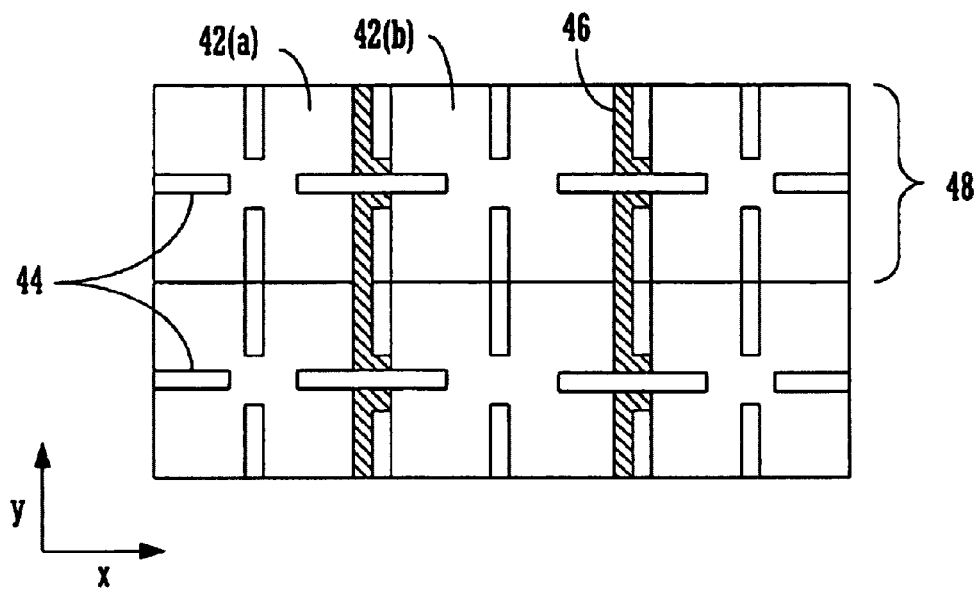
FIG. 5 shows a top view of a lower portion of a group of switches in an array of switches.

FIG. 5 shows a plan view of a portion of an array of switches according to an embodiment of the invention. Lower conductive regions 42(*a*), 42(*b*) correspond to columns in an array of switches. The lower conductive regions 42(*a*), 42(*b*) can be, for example, a conductive ink that is printed on an insulating substrate. The columns of lower conductive regions 42(*a*), 42(*b*) are electrically isolated from each other by insulating regions 46. A number of insulating spacers 44 are on the lower conductive regions 42(*a*), 42(*b*).

The insulating spacers 44 space the lower conductive regions 42(*a*), 42(*b*) of the switches from their corresponding upper conductive regions (not shown). The upper conductive regions are separated from the lower conductive regions 42(*a*), 42(*b*) by an air gap. In the absence of applied pressure, the air gap separates the upper and lower conductive regions so that the switch is open.

Figure 6:
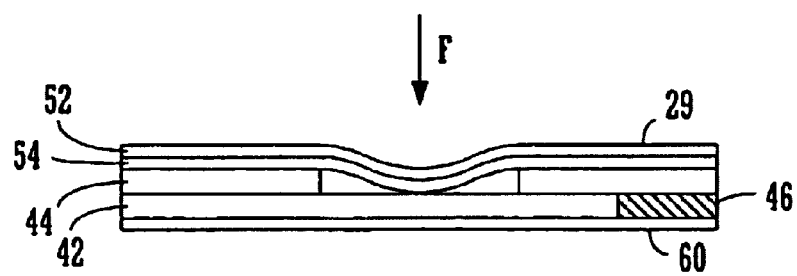
FIG. 6 shows a cross-sectional view of a portion of a switch as pressure is applied to the switch.

When pressure is applied to the switch, an upper conductive region contacts the lower conductive region of the switch thus forming a closed circuit. Referring to FIG. 6, pressure can be applied to a major surface 29 of the base unit. The user can apply pressure to the major surface 29 by using, for example, a finger or a marking instrument.

The major surface 29 can be on an upper insulating layer 52 that has an upper conductive region 54 printed on it. The upper insulating layer 52 can be made of, for example, Mylar™ or any other suitable flexible insulating material. Insulating spacers 44 keep the upper conductive region 54 and a lower conductive region 42 on a lower insulating layer 60 from contacting each other. However, when pressure is applied to the major surface 29, the upper insulating layer 52 and the upper conductive region 54 deform. The upper conductive region 54 and the lower conductive region 42 then contact each other, thus activating the switch. The conductive material making up the conductive regions may be solid or patterned. Patterning the conductive material saves cost, as less conductive material is needed to produce the interactive apparatus.

The maximum lateral spacing of adjacent insulating spacers 44 that separate the upper and lower conductive regions of a switch may be adjusted so that a user's palm does not activate the switch while permitting a user's finger or a marking instrument to activate switch. For example, in some embodiments, the maximum lateral spacing between adjacent insulating spacers 44 can be about 0.125 inches to about 0.5 inches (or less). By doing so, the user can rest the user's palm on the major surface of the base unit, without inadvertently activating the switches underneath the major surface.

The locations at which contact is made between upper conductive region 54 and lower conductive region 42 may correspond to a pattern marked or noted on an interactive activity sheet or template that is placed on major surface 29. In the interactive apparatus embodiments, a set of paired conductive regions 42 and 54, may be included in a pattern that denotes the outlines of a block letter "A". There may be, for example, 10 pairs of contact points underlying the outlines of a block letter "A" on an activity sheet. When a crayon is used to color in the letter "A" on the activity sheet, the set of 10 contact pairs are repeatedly, sequentially, activated, and the interactive apparatus responds with an audio signal. For example, the audio may say, "That's the letter A. It says "aeh" or "aacee" as in apple or April" The interactive apparatus may continue to play other audio as long as the letter "A" is being colored in. For example, it may go on to play the song "April Showers" or say the poem, "An apple a day keeps the doctor away". If a child is coloring in the block letter "A", the coloring activity may not be completely continuous. The child may stop for a few seconds, holding the crayon off the sheet. When the child begins to start coloring again, it is not necessarily desirable to have the audio begin from the beginning, particularly if the child's pause in activity was only for a couple of seconds. Because traditional "debounce" techniques are symmetric, use of a traditional debounce technique would delay the onset of signal acknowledgement when the child started to color as well as delaying the restart of signal after a pause. (A traditional debounce technique would count to a pre-set number of repeat contacts before acknowledging a signal as bonefide, e.g. not spurious, and wait for the same pre-set number of contacts in a row to be missed before acknowledging that the signal was terminated.) It would not be desirable to have a delay in the onset of audio when the child began to draw, so known debounce techniques were not useful to cure the problem of the audio starting over each time the child paused for a few seconds. Consequently the present interactive apparatus was designed to benefit from an inventive asymmetric debounce technique. The initiation of contact within a set of contacts is termed a "down transition" and the cessation of contact within a set of contacts is termed an "up transition". In the inventive asymmetric debounce technique, for a given sampling rate for electrical signal activity, the down transition requires only a single time sample of the contact set to show an electrical signal, to acknowledge a signal as bonefide (or "good"). In contrast, the up transition being detected, to acknowledge a cessation in activity. If an electrical signal is detected any time before the $39^{th}$ time sample, the audio resumes as if there had been no interruption at all (the values 1 and 39 were selected for purposes of illustration; the asymmetric debounce technique generally only desirably uses values that are very different and therefore any suitable values may be used). Thus, unwarranted jumps to the beginning of the audio are avoided. Accordingly, in embodiments of the invention, if the user does not interact with a sheet within a predetermined of time, the audio may start over, and may not continue from the prior audio played to the user.

Figure 7:
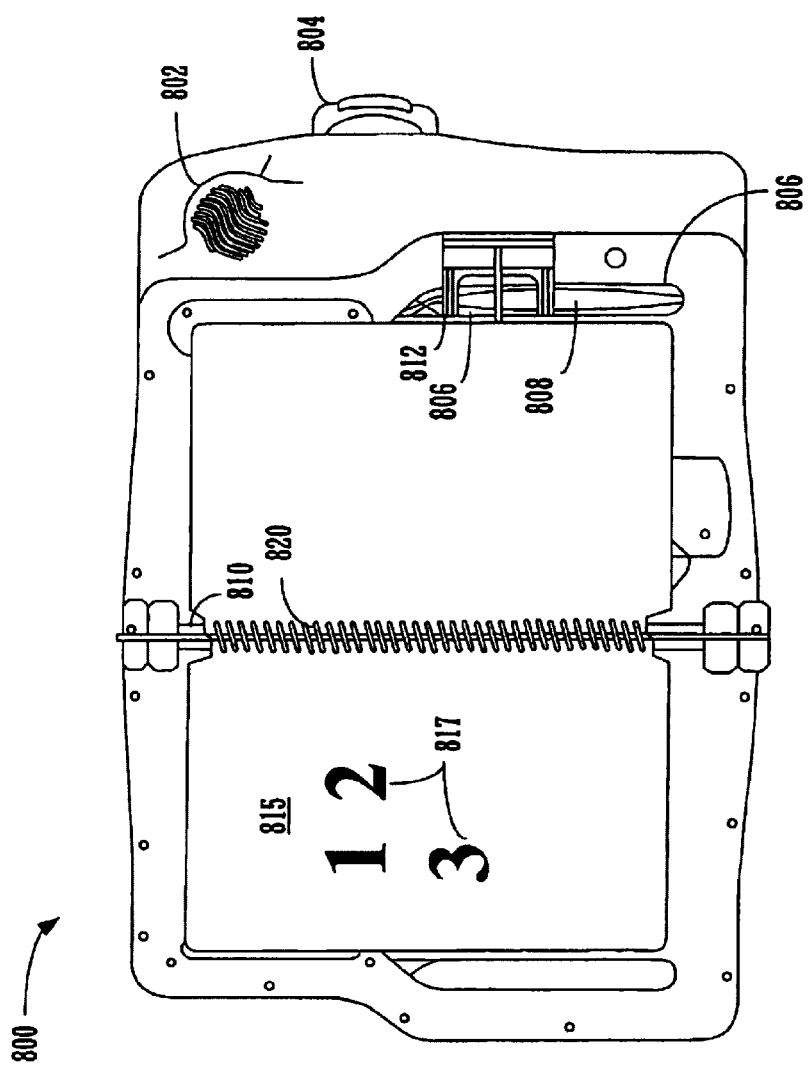
FIG. 7 shows a top view of an interactive apparatus comprising a base unit with a hinge and two portions that move about the hinge.

In the embodiments described above, the base unit is generally a single, integral body. However, in other embodiments, the base unit may have a hinge so that portions of the base unit fold on each other. FIG. 7 shows a base unit 800 with a hinge 810. A book 815 with print elements 817 may be on the base unit 800. A speaker 802 is in the base unit 800 and a cartridge 804 is in a slot (not shown) at a side of the base unit 800. An indentation 806 outside the border provides a location to store a stylus 808 when the platform is brought to a closed configuration. An optional stylus holder 812 may be included to hold the stylus 808. The stylus 808 has the ability to mark on the book 815. In this example, the book 815 includes a number of print elements 817 in the form of the numbers 1, 2, and 3. The user can mark on these print elements with the stylus 808 and audio output respectively relating to the numbers 1, 2, and 3 can be presented to the user. Other details regarding hinge-type base units can be found in U.S. patent application Ser. No. 09/777,262, filed Feb. 5, 2001. This patent application is herein incorporated by reference for all purposes and is assigned to the same assignee as the present application.

Figure 8B:
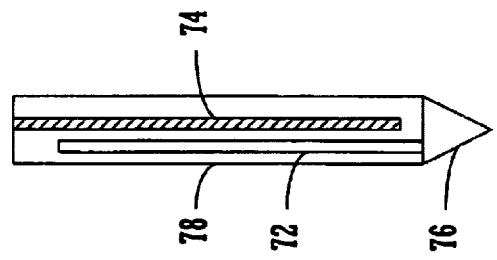
FIGS. 8(*a*) and 8(*b*) show cross-sectional views of marking instruments according to embodiments of the invention.
Figure 8A:
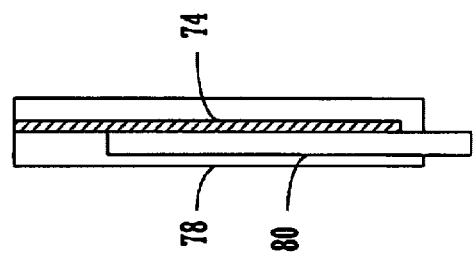

As noted above, in some embodiments, the base unit may comprise an array of electrical elements that are antennas. In these embodiments, the stylus that is used with the base unit may comprise a receiving antenna and may be coupled to the base unit with a wire. The stylus may be a marking instrument that holds, for example, a pencil or a crayon. When the user makes a mark in the vicinity of a specific print element with the stylus, the antenna in the stylus can receive a signal specific to antenna that is directly under the antenna in the stylus. Two examples of such styluses are shown in FIGS. 8(*a*) and 8(*b*). In FIGS. 8(*a*) and 8(*b*), the wires to the styluses are not shown. FIG. 8(*a*) shows a stylus including a housing 78. The stylus housing 78 houses an antenna and an ink reservoir 72. Ink in the ink reservoir 72 may feed a tip region 76 of the stylus. FIG. 8(*b*) shows a stylus with a stylus housing 78 and an antenna 74. In this embodiment, the stylus can hold, for example, a marking element 80 such as a crayon or a pencil lead. Unlike the embodiment shown in FIG. 8(*a*), a separate, preformed, marking element 80 can be inserted and secured into the stylus housing 78.

Interactive Systems

In some embodiments of the invention, computer code that can be used in the interactive apparatus can be sent (e.g., downloaded) to the user from a remote server computer. The code may be for different outputs for different sheets and/or for different print elements on the different sheets (or instructions to play the outputs). Code for producing sheets with different print elements can also be sent to the user. The code for the sheets may be in the form of standard graphics files such as bitmap files or JPEG files. Once the code for the sheets is downloaded to the user site, the sheets can be printed at the user's site using a printer. After the sheets are printed, they can then be used with the interactive apparatus. Moreover, electronic maps for the downloaded sheets can also be downloaded to the user site. In some embodiments, any or all of the code for the sheets, the electronic maps, and the code for the outputs associated with the print elements on the sheets can be included in a content package that can be sent to from the remote server computer to the user's site.

A system according to an embodiment of the invention can be described with reference to FIG. 9. The system includes a host site 199 and a user site 120. The user site 120 may be, for example, a home, school, or workplace. The host site 199 and the user site 120 are coupled through a communication medium 107. Many user sites may be present. However, only one user site is shown for simplicity of illustration.

The host site 199 may include a server computer 105 operated by a host company. In this example, the host site 199 has a server computer 105 that can access a content database 103 and a personal profile database 101.

The server computer 105 is typically a powerful computer or cluster of computers. For example, the server computer can be a large mainframe, a minicomputer cluster, or a group of servers functioning as a unit. In one example, the server computer may be a database server coupled to a Web server. The server computer can behave as a single computer that services the requests of one or more client computers. For example, one or more client computers 109 at different user sites can communicate with the server computer through the communication medium 107 and optionally through one or more Internet Service Providers (ISPs) (not shown). The client computers typically have less memory and less computing power than the server computer 105. The server computer 105 can be remotely located with respect to the client computer 109.

The server computer 105 can have computer code for performing any suitable function. For example, the server computer 105 can have code for updating a user profile in a user profile database, retrieving data from any suitable database, and sending data to any person. Computer code may also be provided for selecting content for a content package, assembling the content package, and sending the content package to the user. The content package may include code for audio outputs, code for graphic outputs, code for instructions to play audio or graphics output, code for sheets with print elements, code for personalized information, code for electronic maps associating the print elements with specific outputs, etc.

The server computer 105 and the client computer 109 communicate through a communication medium such as the Internet, and more particularly the World Wide Web (WWW). Typical communication protocols that can be used by the server computer 105, the client computer may include HTTP (hypertext transfer protocol), TCP/IP (terminal communication protocol/Internet protocol), or other protocol.

The server computer 105 may have data representing a Web site. The Web site may have any suitable number of Web pages and is preferably entertaining to users under 18 years of age. On the Web site, the user (or other person such as the user's parents) can, for example, create a user profile, set operational preferences, play games, and select content for a content package.

The personal profile database 101 may include the user's personal preferences and information about the user. The user profile information may include basic information about the user. Such basic information includes the user's age, hobbies, address, phone number, e-mail address, school, relatives, teachers, parents, phone number, etc. The user profile information may also include information regarding the user's preferences. User preferences may include preferences such as favorite subjects, relatives, teachers, favorite songs, favorite sports, favorite foods, and favorite cartoons.

Information in the personal profile database 101 can be used to identify information that can be downloaded to the user site 120 and then transferred to the interactive apparatus 113. By doing so, the user's experience can be personalized. For example, the user's profile may indicate that the user likes sports. Code for sheets with math problems or sentences that relate to sports can be selected for the user and can be downloaded by the user for use in the interactive apparatus.

The content database 103 may include any suitable content. The content may include information that can be used in the interactive apparatus. Examples of such information include problems (e.g., questions, puzzles, riddles, quizzes), as well as songs, games, hints, music, facts, greetings, and messages (e.g., help, encouragement, reminders, or error messages). The content database 103 can also include code for electronic maps for different sheets. In addition, computer code for sheets with print elements can be present in the content database 103. The code can be downloaded to the user site 120 and the sheets can then be printed at the user site 120 using a printer.

The content in the content database 103 may also be in any suitable form. For example, the content may be in the form of compressed or uncompressed data. The content may be in the form of sound files such as MP3 files, WAV files, and MIDI (Musical Instrument Digital Interface) files. The content may also be in the form of graphic files such as video files, image files (e.g., bitmaps), and text files.

At the user's site 120, a client computer 109 can be operatively coupled to a linker device 111 and a printer 115. The printer 115 and the linker device 111 may be coupled to the client computer 109 through a wireless or a wired link (e.g., a cable). The interactive apparatus 113 can receive computer code from the server computer 105 through the client computer 109 via the linker device 111.

The client computer 109 and the printer 115 may have any suitable characteristics. For example, the client computer 109 can be an ordinary personal computer running a Windows™ based operating system. It may have a suitable Internet browser such as Microsoft Explorer™. The printer 115 may be any suitable printing apparatus. Suitable examples of printers include thermal printers, laser printers, ink-jet printers, dot matrix printers, etc.

The linker device 111 may be any suitable device capable of transferring data between the client computer 109 and the interactive apparatus 113. The linker device 111 could be, for example, a wireless transceiver such as a wireless RF (radio frequency) transceiver or an infrared transceiver. In preferred embodiments, however, the linker device 111 is capable of reading information from, and writing information to, the transferable information storage medium. In a typical embodiment, the transferable information storage medium may be a cartridge that can be inserted into both the linker device 111 and the base unit of the interactive apparatus 113. Using the linker device 111, data can be transferred to the interactive apparatus directly or indirectly.

Figure 9:
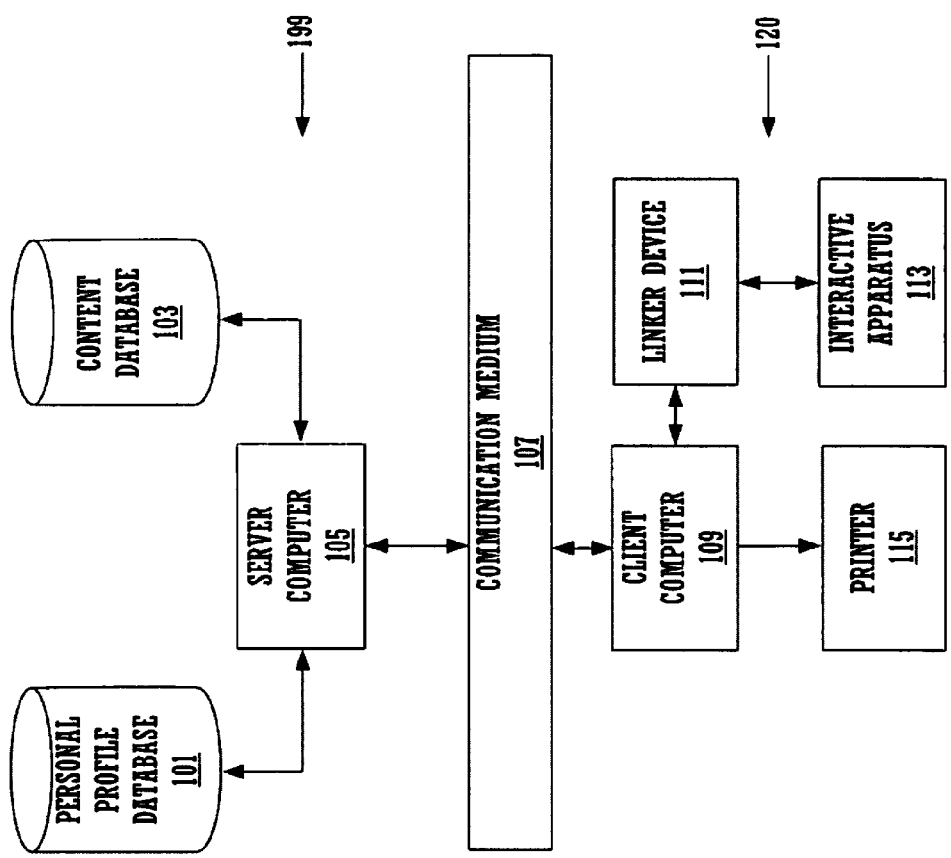
FIG. 9 shows a block diagram of a system according to an embodiment of the invention.

In an illustrative use of the system shown in FIG. 9, a user can use the client computer 109 to contact the server computer 105 through the communication medium 107. While visiting a Web site on the server computer 105, the user may select specific sheets with specific print elements for downloading. Alternatively or additionally, the server computer 105 can then retrieve specific content for the user from the content database 103 using the user's personal profile in the personal profile database 101. All content can then be collected together to form of a content package. The content package can include, for example, code for new sheets that can be printed using a standard printer, electronic maps associating the print elements in the sheets with particular locations on a base unit and particular outputs, and code for producing specific outputs in the interactive apparatus.

The client computer 109 can receive the content package. The user may then insert a data cartridge into the linker device 111 and code for the electronic maps and the code for producing the specific outputs can be loaded onto the data cartridge using the linker device 111. The user can then remove the data cartridge from the linker device 111 and can plug the transferable information storage medium into the base unit of the interactive apparatus 113. In the base unit, the newly transferred computer code can update the functionality of the interactive apparatus so that it can be used with the downloaded sheets.

Before or after code is loaded into the base unit of the interactive apparatus, the user can preview the sheets on a display device (not shown) such as a VGA display device coupled to the client computer 109. After previewing the sheets using the display device, the sheets can be printed out using the printer 115, which is also coupled to the client computer 109. These sheets can be used with the updated interactive apparatus 113 in the manner previously described.

The system shown in FIG. 9 has a number of advantages. For example, by using the system shown in FIG. 9, a number of different sheets with different print elements can be downloaded to the user's site. Computer code (e.g., electronic maps) used to reprogram the interactive apparatus for new sheets can also be downloaded. Accordingly, the user is not limited to using a particular set of sheets that might be available at, for example, a local store. The user can have ready access to new and different content so that the interactive apparatus is more interesting to the user.

In some embodiments, the interactive apparatus can be used with other types of devices to form a set of devices that can be used, for example, to educate a child as the child grows. Each device (e.g., an educational toy) can be designed to educate a child in a certain age range. For example, the interactive apparatus according to embodiments of the invention can be designed to help educate children between the ages of 3 to 6 years old. Another device, such as an embodiment that is shown and described in U.S. Pat. No. 6,142,784 (which is assigned to the same assignee as the present invention and which is herein incorporated by reference in its entirety), can be used to educate children between the ages of 7 to 12 years of age. Other devices can be used to educate children from the ages 12 to 16, 1 to 3, etc. This set of devices can be used together as part of a personalized tutorial service so that a child has different types of devices that can complement each other and help a child learn as the child grows.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

What is claimed is:

1. A method of utilizing a sheet of print media in an interactive system, said method comprising:
    a) a receiving code for rendering a sheet having a print element printed on the sheet wherein the printed sheet includes a printed identifier printed on the sheet, wherein the printed identifies the sheet to a base unit, wherein the sheet is identified to the base unit after the user manually selects the printed identifier, and wherein the code is sent from a server computer to a client computer at a user site wherein the base unit of an interactive apparatus unit includes a surface to receive said sheet and an array of electrical elements under the surface; and
    b) in response to user interaction with the print element while the sheet is disposed on the base unit rendering an output related to the print element.

2. The method of claim 1 wherein said user interaction with the print element comprises applying pressure to the print element.

3. The method of claim 1 wherein the array of electrical elements comprises an array of pressure sensitive electrical elements.

4. The method of claim 1 wherein the array of electrical elements comprises an antenna array of antennas.

5. The method of claim 1 wherein said user interaction with the print element includes marking on the sheet in the vicinity of the print element.

6. The method of claim 1 wherein the print element is a letter, number, or symbol.

7. The method of claim 1 wherein the output is an audio output.

8. The method of claim 1 wherein said user interaction with the print element comprises marking on the print element.

9. The method of claim 1 wherein said user interaction with the print element includes selecting the print element with a stylus.

10. The method of claim 1 wherein said receiving code comprises sending code from the server computer to the client computer via the Internet.

11. The method of claim 1 further comprising:
    transferring code for an audio output for the print element from the server computer to the client computer; and
    transferring the code for the audio output to the interactive apparatus.

12. The method of claim 1 further comprising:
    transferring code for an audio output for the print element from the server computer to the client computer;
    transferring the code for the audio output for the print element from the client computer to a transferable information storage medium; and
    inserting the transferable information storage medium into the base unit.

13. The method of claim 1 wherein the printed sheet includes an identifier printed on the sheet, wherein the identifier identifies the sheet to the base unit.

14. A method of utilizing a sheet of print media in an interactive system, said method comprising:

a) receiving code for an audio output for rendering a sheet having a print element printed on the sheet, wherein the code is sent from a server computer to a client computer at a user site wherein a base unit of an interactive apparatus unit includes a surface to receive said sheet and an array of electrical elements under the surface;

b) transferring the code for the audio output to the interactive apparatus; and c) in response to user interaction with the print element while the sheet is disposed on the base unit rendering the audio output related to the print element.

15. The method of claim 14 wherein said user interaction with the print element comprises applying pressure to the print element.

16. The method of claim 14 wherein the array of electrical elements comprises an array of pressure sensitive electrical elements.

17. The method of claim 14 wherein the array of electrical elements comprises an antenna array of antennas.

18. The method of claim 14 wherein said user interaction with the print element includes marking on the sheet in the vicinity of the print element.

19. The method of claim 14 wherein the print element is a letter, number, or symbol.

20. The method of claim 14 wherein the output is an audio output.

21. The method of claim 14 wherein said user interaction with the print element comprises marking on the print element.

22. The method of claim 14 wherein said user interaction with the print element includes selecting the print element with a stylus.

23. The method of claim 14 wherein said receiving code comprises sending code from the server computer to the client computer via the Internet 24. The method of claim 14 further comprising:

transferring code for an audio output for the print element from the server computer to the client computer;

transferring the code for the audio output for the print element from the client computer to a transferable information storage medium; and inserting the transferable information storage medium into the base unit.

25. The method of claim 14 wherein the printed sheet includes an identifier printed on the sheet, wherein the identifier identifies the sheet to the base unit.

26. The method of claim 14 wherein the printed sheet includes a printed identifier printed on the sheet, wherein the printed identifier identifies the sheet to base unit, and wherein the sheet is identified to the base unit after the user manually selects the printed identifier.

27. A method of utilizing a sheet of print media in an interactive system, said method comprising:

a) receiving code for an audio output for rendering a sheet having a print element printed on the sheet, wherein the code is sent from a server computer to a client computer at a user site wherein a base unit of an interactive apparatus unit includes a surface to receive said sheet and an array of electrical elements under the surface;

b) transferring the code for the audio output for the print element from the client computer to a transferable information storage medium;

c) inserting the transferable information storage medium into the base unit; and d) in response to user interaction with the print element while the sheet is disposed on the base unit rendering the audio output related to the print element.

28. The method of claim 27 wherein said user interaction with the print element comprises applying pressure to the print element.

29. The method of claim 27 wherein the array of electrical elements comprises an array of pressure sensitive electrical elements.

30. The method of claim 27 wherein the array of electrical elements comprises an antenna array of antennas.

31. The method of claim 27 wherein said user interaction with the print element includes marking on the sheet in the vicinity of the print element.

32. The method of claim 27 wherein the print element is a letter, number, or symbol.

33. The method of claim 27 wherein the output is an audio output.

34. The method of claim 27 wherein said user interaction with the print element comprises marking on the print element.

35. The method of claim 27 wherein said user interaction with the print element includes selecting the print element with a stylus.

36. The method of claim 27 wherein said receiving code comprises sending code from the server computer to the client computer via the Internet.

37. The method of claim 27 further comprising:

transferring the code for the audio output to the interactive apparatus.

38. The method of claim 27 wherein the printed sheet includes an identifier printed on the sheet, wherein the identifier identifies the sheet to the base unit.

39. The method of claim 27 wherein the printed sheet includes a printed identifier printed on the sheet, wherein the printed identifier identifies the sheet to base unit, and wherein the sheet is identified to the base unit after the user manually selects the printed identifier.

* * * * *